United States Patent
Kambe et al.

(10) Patent No.: US 7,132,783 B1
(45) Date of Patent: Nov. 7, 2006

(54) PHOSPHOR PARTICLES HAVING SPECIFIC DISTRIBUTION OF AVERAGE DIAMETERS

(75) Inventors: Nobuyuki Kambe, Menlo Park, CA (US); Xiangxin Bi, San Ramon, CA (US)

(73) Assignee: NanoGram Corporation, Milpitas, CA (US)

( * ) Notice: Subject to any disclaimer, the term of this patent is extended or adjusted under 35 U.S.C. 154(b) by 0 days.

(21) Appl. No.: 08/962,362

(22) Filed: Oct. 31, 1997

(51) Int. Cl.
*H01J 1/63* (2006.01)
*H05B 33/14* (2006.01)
*C09K 11/56* (2006.01)
*C09K 11/78* (2006.01)

(52) U.S. Cl. ............. 313/467; 313/503; 313/496; 252/301.4 R; 252/301.4 S

(58) Field of Classification Search ............. 313/467, 313/468, 485, 486, 487, 496, 503; 315/169.3, 315/163.4; 252/301.4 R, 301.4 S
See application file for complete search history.

(56) References Cited

U.S. PATENT DOCUMENTS

| | | | |
|---|---|---|---|
| 2,603,554 A | 7/1952 | Calbeck | 23/147 |
| 2,610,154 A | 9/1952 | Brown, Jr. | 252/301.6 |
| 2,854,413 A | 9/1958 | Geary | 252/301.6 |
| 2,863,084 A | 12/1958 | Arnott et al. | 315/1 |
| 2,898,191 A | 8/1959 | Conn et al. | 23/147 |
| 2,968,627 A | 1/1961 | Wachtel | 252/301.6 |
| 3,040,202 A | 6/1962 | Lehmann | 313/108 |
| 3,131,025 A | 4/1964 | Carnall, Jr. et al. | 23/135 |
| 3,260,879 A | 7/1966 | Feuer | 313/108 |
| 3,406,228 A | 10/1968 | Hardy et al. | 264/0.5 |
| 3,691,088 A | 9/1972 | Pelton | 252/301.6 S |
| 3,776,754 A | 12/1973 | Levinos | 117/33.5 |
| 3,984,586 A | 10/1976 | Kawarada et al. | 252/301.6 S |
| 4,116,864 A | 9/1978 | Kagami et al. | 252/301.6 S |
| 4,172,920 A | 10/1979 | Kanda et al. | 428/403 |
| 4,275,333 A | 6/1981 | Kagami et al. | 313/495 |
| 4,680,231 A | 7/1987 | Yamaura et al. | 428/407 |
| H429 H | 2/1988 | Harris et al. | 423/561 R |
| 4,808,398 A | 2/1989 | Heistand, II | 423/622 |
| 4,921,767 A | 5/1990 | Datta et al. | 430/23 |
| 4,960,654 A | 10/1990 | Yoshinaka et al. | 428/614 |
| 5,128,063 A | 7/1992 | Kamikubo | 252/301.5 |
| 5,152,973 A | 10/1992 | Spencer | 423/419 P |
| 5,167,990 A | 12/1992 | Tono et al. | 427/421.5 |
| 5,225,820 A * | 7/1993 | Clerc | 345/55 |
| 5,250,281 A | 10/1993 | Imai et al. | 423/623 |
| 5,264,031 A | 11/1993 | Palmer et al. | 106/401 |

(Continued)

FOREIGN PATENT DOCUMENTS

JP     02309592     12/1990

(Continued)

OTHER PUBLICATIONS

Chris Curtin, *The Field Emission Display :A New Flat Panel Technology*, Conference Record of the 1991 International Display Research Conference, pp. 12-15, Oct. 1991.*

(Continued)

*Primary Examiner*—Karabi Guharay
(74) *Attorney, Agent, or Firm*—Dardi & Associates, PLLC; Peter S. Dardi

(57) ABSTRACT

Small particles provide for improved performance as phosphors especially in the production of display devices. Particles with an diameter less than about 100 nm have altered band properties that affect the emission by the particles. A collection of such small particles with a narrow distribution around a selected average diameter can be used to produce emission at a desired frequency. These particles are effective for producing a wide variety of display types including flat panel displays. Laser pyrolysis provides an efficient process for the production of desired particles.

16 Claims, 4 Drawing Sheets

U.S. PATENT DOCUMENTS

| | | | | |
|---|---|---|---|---|
| 5,390,276 | A | 2/1995 | Tai et al. | 385/146 |
| 5,418,062 | A | 5/1995 | Budd | 428/403 |
| 5,422,907 | A * | 6/1995 | Bhargava | 372/68 |
| 5,442,254 | A * | 8/1995 | Jaskie | 313/485 |
| 5,446,286 | A * | 8/1995 | Bhargava | 250/361 R |
| 5,455,489 | A * | 10/1995 | Bhargava | 313/468 |
| 5,460,701 | A * | 10/1995 | Parker et al. | 204/164 |
| 5,498,369 | A | 3/1996 | Bredol et al. | 252/301.65 |
| 5,504,599 | A | 4/1996 | Okibayashi et al. | 359/50 |
| 5,527,519 | A | 6/1996 | Miksits et al. | 423/622 |
| 5,578,899 | A | 11/1996 | Haven et al. | 313/422 |
| 5,635,154 | A | 6/1997 | Arai et al. | 423/592 |
| 5,637,258 | A | 6/1997 | Goldburt et al. | 252/301.4 R |
| 5,643,496 | A | 7/1997 | Brese et al. | 252/301.65 |
| 5,651,712 | A | 7/1997 | Potter | 445/24 |
| 5,893,999 | A * | 4/1999 | Tamatani et al. | 252/301.4 R |
| 5,965,192 | A * | 10/1999 | Potter | 427/64 |
| 6,015,326 | A * | 1/2000 | Potter | 445/52 |
| 6,200,680 | B1 | 3/2001 | Takeda et al. | |
| 6,254,805 | B1 * | 7/2001 | Potter | 252/301.4 R |

FOREIGN PATENT DOCUMENTS

| | | |
|---|---|---|
| WO | WO 98 37165 A | 8/1998 |

OTHER PUBLICATIONS

RCA Electro—Optics Handbook, p. 14, 1974 no month.*

Instruments of Science: An Historical Encyclopedia, pp. 107-110, Garland Publishing, Inc., 1998 no month.*

The Gale Encyclopedia of Science, vol. 2, Gale Research, pp. 802-805, 1996 no month.*

Instruments of Science: An Historical Encyclopedia, pp. 107-110, Garland Publishing, Inc., 1998.*

The Gale Encyclopedia of Science, vol. 2, Gale Research, pp. 802-805, 1996.*

"Synthesis and Characterization of Metal-Oxide Nanocrystals prepared by $CO_2$-Laser-Heated Vaporization/Condensation" by Tissue et al., Journal of the SID, vol. 4(3), pp. 213-217 (Oct. 1996).

"Synthesis of Nanoparticles by a Laser Vaporization-Controlled Condensation Technique" by El-Shall et al., SPIE vol. 3123, pp. 98-108 (Jul. 1997).

Murray et al., "Synthesis and Characterization of Nearly Monodisperse CdE (E=S, Se, Te) Semiconductor Nanocrystallics." J. Am. Chem. Soc., 115, pp. 8706-8715, 1993.

* cited by examiner

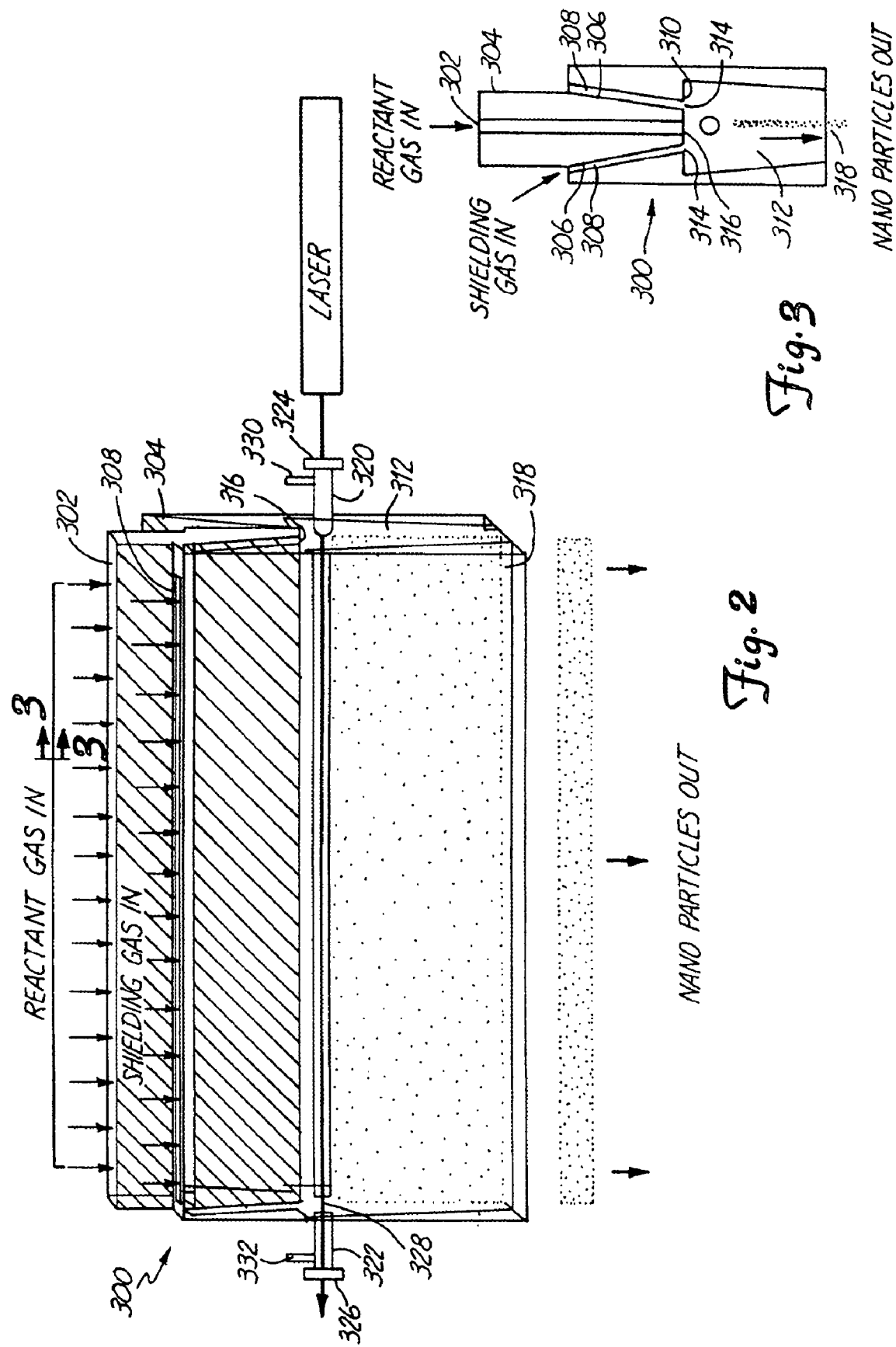

PHOSPHOR PARTICLES HAVING SPECIFIC DISTRIBUTION OF AVERAGE DIAMETERS

FIELD OF THE INVENTION

The invention relates to phosphor particles that emit light at desired wavelengths following stimulation and devices made with these particles. The invention further relates to methods of producing phosphor particles.

BACKGROUND OF THE INVENTION

Electronic displays often use phosphor material, which emits visible light in response to interaction with electrons. Phosphor materials can be applied to substrates to produce cathode ray tubes, flat panel displays and the like. Improvements in display devices place stringent demands on the phosphor materials, for example, due to decreases in electron velocity and increases in display resolution. Electron velocity is reduced in order to reduce power demands. In particular, flat panel displays generally require phosphors responsive to low velocity electrons.

In addition, a desire for color display requires the use of materials or combinations of materials that emit light at different wavelengths at positions in the display that can be selectively excited. A variety of materials have been used as phosphors. In order to obtain materials that emit at desired wavelengths of light, activators have been doped into phosphor material. Alternatively, multiple phosphors can be mixed to obtain the desired emission. Furthermore, the phosphor materials must show sufficient luminescence.

SUMMARY OF THE INVENTION

Small, nanoscale particles provide improved performance as phosphors. For example, particles with average diameters less than about 100 nm have altered band gaps with emission frequencies that are functions of the particle diameters. Therefore, collections of these particles with a narrow distribution of diameters can be used to provide selected emission frequencies without necessarily altering the particle composition. The small size of the particles also results in high luminescence, responsiveness to low velocity electrons as well as processing advantages. Laser pyrolysis provides an efficient method for the production of highly pure nanoscale particles with a narrow distribution of particle sizes.

In a first aspect, the invention features a display device comprising phosphor particles having an average diameter selected to yield light emissions in a desirable portion of the electromagnetic spectrum following excitation and the phosphors particles having an average diameter less than about 100 nm. The phosphor particles can comprise a metal compound such as ZnO, ZnS, $TiO_2$ and $Y_2O_3$. The phosphor particles preferably have an average diameter from about 5 nm to about 50 nm and a diameter distribution such that at least about 95 percent of the particles have a diameter greater than about 60 percent of the average diameter and less than about 140 percent of the average diameter. In certain embodiments, the excitation of the phosphors is accomplished with low velocity electrons.

In another aspect, the invention features a composition for application by photolithography comprising phosphor particles and a curable polymer, the phosphor particles having an average diameter and a distribution of diameters selected to yield light emissions in a selected portion of the electromagnetic spectrum following excitation and the phosphor particles having an average diameter less than about 100 nm. The curable polymer can be curable by UV radiation or by electron beam radiation. The phosphor particles preferably have an average diameter from about 5 nm to about 50 nm.

In another aspect, the invention features a method for producing zinc oxide particles comprising the step of pyrolyzing a molecular stream comprising a zinc precursor, an oxidizing agent and a radiation absorbing gas in a reaction chamber, where the pyrolysis is driven by heat absorbed from a laser beam. The zinc oxide particles preferably have an average diameter less than about 150 nm and more preferably an average diameter from about 5 nm to about 50 nm. In practicing the method, the laser beam preferably is produced by a $CO_2$ laser and the molecular stream preferably is elongated in one dimension. Suitable zinc precursor include $ZnCl_2$.

In another aspect, the invention features a method for producing zinc sulfide particles comprising the step of pyrolyzing a molecular stream comprising a zinc precursor, a sulfur source and a radiation absorbing gas in a reaction chamber, where the pyrolysis is driven by heat absorbed from a laser beam.

Other features and advantages of the invention are apparent from the following description of the preferred embodiments, and from the claims.

BRIEF DESCRIPTION OF THE DRAWING

FIG. 2 is a schematic, perspective view of a reaction chamber of an alternative embodiment of the laser pyrolysis apparatus, where the materials of the chamber are depicted as transparent to reveal the interior of the apparatus.

FIG. 3 is a sectional view of the reaction chamber of FIG. 2 taken along line 3—3.

DESCRIPTION OF THE PREFERRED EMBODIMENTS

Figure 1:
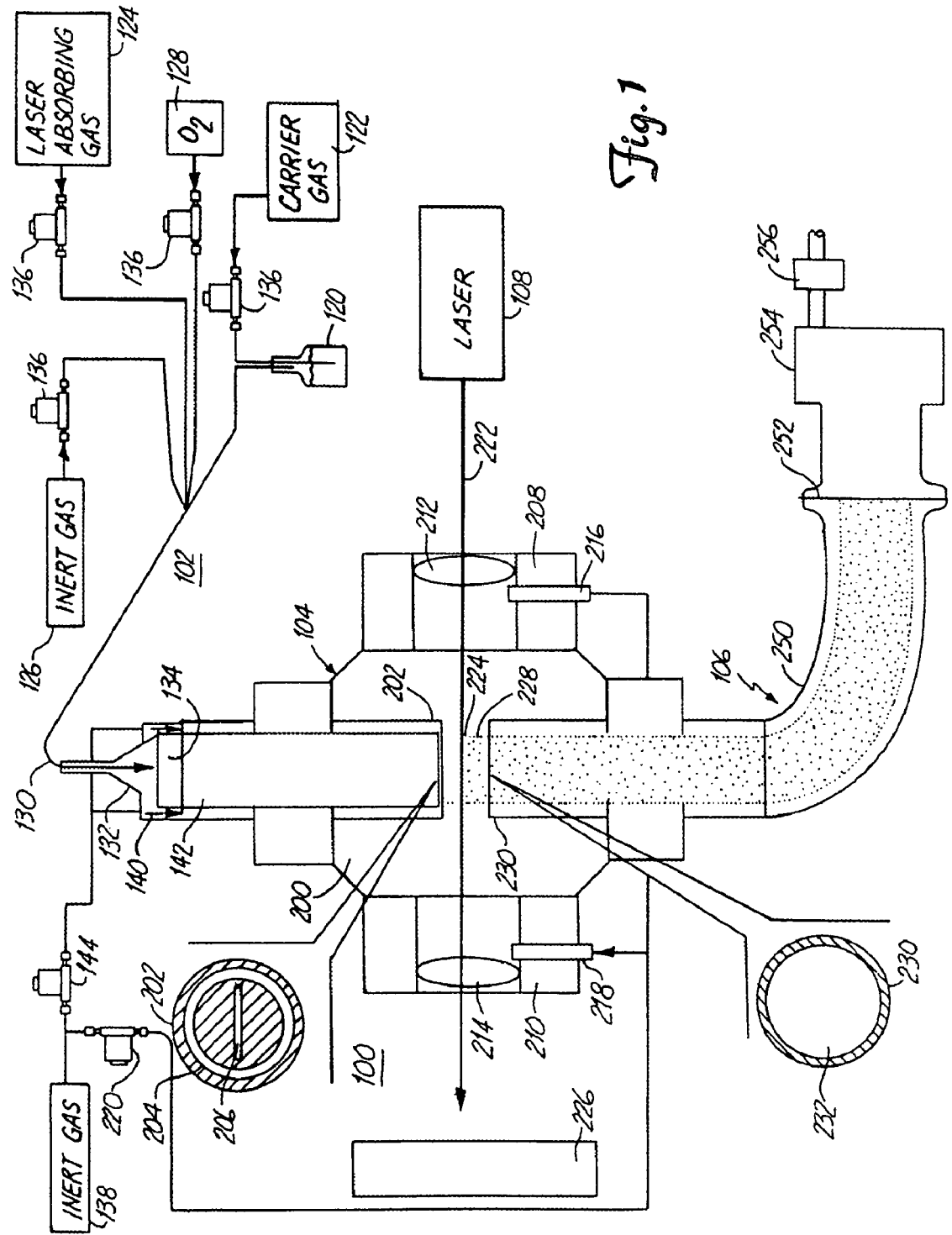
FIG. 1 is a schematic, sectional view of an embodiment of a laser pyrolysis apparatus taken through the middle of the laser radiation path. The upper insert is a bottom view of the injection nozzle, and the lower insert is a top view of the collection nozzle.

Small scale particles can be used as improved phosphor particles. In particular, particles on the order of 100 nm or less have superior processing properties to produce displays, and they have good luminescence. Significantly, the band gap of these materials is size dependent at diameters on the order of 100 nm or less. Therefore, particles with a selected, narrow distribution of diameters can serve as a phosphor at one color (wavelength) while particles of the same or different material with similarly selected average diameter and narrow distribution of sizes can serve as a phosphor at a different color. In addition, the small size of the particles can be advantageous for the production of higher resolution displays.

Appropriate particles generally are chalcogenides, especially ZnO, ZnS, $TiO_2$, and $Y_2O_3$. Preferred particles have a desired emission frequency and are highly luminescent. In addition, preferred particles have persistent emission, i.e., there is a significant time for the emission to decay following stimulation of the material. Specifically, there should be sufficient persistence of the emission to allow for human perception. Suitable particles generally are semiconductors, and their emission frequency is determined by the band gap. Preferably, the luminescing state has an energy reasonably close to the excitation energy such that little energy is wasted as heat.

Laser pyrolysis, as described below, is an excellent way of efficiently producing ZnO, ZnS, $TiO_2$ and $Y_2O_3$ particles with narrow distributions of average particle diameters. A basic feature of successful application of laser pyrolysis for the production of appropriate small scale particles is production of a molecular stream containing a metal precursor compound, a radiation absorber and a reactant serving as an oxygen or sulfur source, as appropriate. The molecular stream is pyrolyzed by an intense laser beam. The intense heat resulting from the absorption of the laser radiation induces the reaction of the metal compound precursor in the oxygen or sulfur environment. As the molecular stream leaves the laser beam, the particles are rapidly quenched.

A. Particle Production

Laser pyrolysis has been discovered to be a valuable tool for the production of nanoscale metal oxide and sulfide particles of interest. In addition, the metal oxide and sulfide particles produced by laser pyrolysis are a convenient material for further processing to expand the pathways for the production of desirable metal compound particles. Thus, using laser pyrolysis alone or in combination with additional processes, a wide variety of metal oxide and sulfide particles can be produced. In some cases, alternative production pathways can be followed to produce comparable particles.

The reaction conditions determine the qualities of the particles produced by laser pyrolysis. The reaction conditions for laser pyrolysis can be controlled relatively precisely in order to produce particles with desired properties. The appropriate reaction conditions to produce a certain type of particles generally depend on the design of the particular apparatus. Nevertheless, some general observations on the relationship between reaction conditions and the resulting particles can be made.

Reactant gas flow rate and velocity of the reactant gas stream are inversely related to particle size so that increasing the reactant gas flow rate or velocity tends to result in smaller particle size. Also, the growth dynamics of the particles have a significant influence on the size of the resulting particles. In other words, different crystal forms of a metal compound have a tendency to form different size particles from other crystal forms under relatively similar conditions. Laser power also influences particle size with increased laser power favoring larger particle formation for lower melting materials and smaller particle formation for higher melting materials.

Appropriate metal precursor compounds generally include metal compounds with suitable vapor pressures, i.e., vapor pressures sufficient to get desired amounts of precursor vapor in the reactant stream. The vessel holding the precursor compounds can be heated to increase the vapor pressure of the metal compound precursor, if desired. Preferred titanium precursors include, for example, $TiCl_4$ and $Ti[OCH(CH_3)_2]_4$ (titanium tetra-I-propoxide). Preferred yttrium precursors include $Y_5O(OC_3H_7)_{13}$ (yttrium oxide isopropoxide). Preferred zinc precursors include, for example, $ZnCl_2$. $ZnCl_2$ vapor can be generated by heating and, optionally, melting $ZnCl_2$ solids. For example, $ZnCl_2$ has a vapor pressure of about 5 mm Hg at a temperature of about 500° C. When using $ZnCl_2$ precursor, the chamber and nozzle preferably are heated to avoid getting condensation of the precursor.

Preferred reactants suitable as oxygen sources include, for example, $O_2$, CO, $CO_2$, $O_3$ and mixtures thereof. Preferred reactants suitable as sulfur sources include, for example, $H_2S$. The reactant compound serving as the oxygen of sulfur source should not react significantly with the metal precursor compound prior to entering the reaction zone since this generally would result in the formation of large particles.

Laser pyrolysis can be performed with a variety of optical laser frequencies. Preferred lasers operate in the infrared portion of the electromagnetic spectrum. $CO_2$ lasers are particularly preferred sources of laser light. Infrared absorbers for inclusion in the molecular stream include, for example, $C_2H_4$, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy as heat to the other reactants to drive the pyrolysis.

Preferably, the energy absorbed from the radiation beam increases the temperature at a tremendous rate, many times the rate that energy generally would be produced even by strongly exothermic reactions under controlled condition. While the process generally involves nonequilibrium conditions, the temperature can be described approximately based on the energy in the absorbing region. The laser pyrolysis process is qualitatively different from the process in a combustion reactor where an energy source initiates a reaction, but the reaction is driven by energy given off by an exothermic reaction.

An inert shielding gas can be used to reduce the amount of reactant and product molecules contacting the reactant chamber components. Appropriate shielding gases include, for example, Ar, He and $N_2$.

An appropriate laser pyrolysis apparatus generally includes a reaction chamber isolated from the ambient environment. A reactant inlet connected to a reactant supply system produces a molecular stream through the reaction chamber. A laser beam path intersects the molecular stream at a reaction zone. The molecular stream continues after the reaction zone to an outlet, where the molecular stream exits the reaction chamber and passes into a collection system. Generally, the laser is located external to the reaction chamber, and the laser beam enters the reaction chamber through an appropriate window.

Referring to FIG. 1, a particular embodiment 100 of a pyrolysis apparatus involves a reactant supply system 102, reaction chamber 104, collection system 106 and laser 108. Reactant supply system 102 includes a source 120 of metal compound precursor. For liquid precursors, a carrier gas from carrier gas source 122 can be introduced into precursor source 120, containing liquid precursor to facilitate delivery of the precursor. The carrier gas from source 122 preferably is either an infrared absorber or an inert gas and is preferably bubbled through the liquid, metal compound precursor. The quantity of precursor vapor in the reaction zone is roughly proportional to the flow rate of the carrier gas.

Alternatively, carrier gas can be supplied directly from infrared absorber source 124 or inert gas source 126, as appropriate. The reactant serving as the oxygen or sulfur source is supplied from reactant source 128, which can be a gas cylinder or other appropriate container. The gases from the metal compound precursor source 120 are mixed with gases from reactant source 128, infrared absorber source 124 and inert gas source 126 by combining the gases in a single portion of tubing 130. The gases are combined a sufficient distance from reaction chamber 104 such that the gases become well mixed prior to their entrance into reaction chamber 104. The combined gas in tube 130 passes through a duct 132 into rectangular channel 134, which forms part of an injection nozzle for directing reactants into the reaction chamber.

Flow from sources 122, 124, 126 and 128 are preferably independently controlled by mass flow controllers 136. Mass flow controllers 136 preferably provide a controlled flow rate from each respective source. Suitable mass flow controllers include, for example, Edwards Mass Flow Controller, Model 825 series, from Edwards High Vacuum International, Wilmington, Mass.

Inert gas source 138 is connected to an inert gas duct 140, which flows into annular channel 142. A mass flow controller 144 regulates the flow of inert gas into inert gas duct 140. Inert gas source 126 can also function as the inert gas source for duct 140, if desired.

The reaction chamber 104 includes a main chamber 200. Reactant supply system 102 connects to the main chamber 200 at injection nozzle 202. The end of injection nozzle 202 has an annular opening 204 for the passage of inert shielding gas, and a rectangular slit 206 for the passage of reactant gases to form a molecular stream in the reaction chamber. Annular opening 204 has, for example, a diameter of about 1.5 inches and a width along the radial direction of about 1/16 in. The flow of shielding gas through annular opening 204 helps to prevent the spread of the reactant gases and product particles throughout reaction chamber 104.

Tubular sections 208, 210 are located on either side of injection nozzle 202. Tubular sections 208, 210 include ZnSe windows 212, 214, respectively. Windows 212, 214 are about 1 inch in diameter. Windows 212, 214 are preferably plane-focusing lenses with a focal length equal to the distance between the center of the chamber to the surface of the lens to focus the beam to a point just below the center of the nozzle opening. Windows 212, 214 preferably have an antireflective coating. Appropriate ZnSe lenses are available from Janos Technology, Townshend, Vt. Tubular sections 208, 210 provide for the displacement of windows 212, 214 away from main chamber 200 such that windows 212, 214 are less likely to be contaminated by reactants or products. Window 212, 214 are displaced, for example, about 3 cm from the edge of the main chamber 200.

Windows 212, 214 are sealed with a rubber o-ring to tubular sections 208, 210 to prevent the flow of ambient air into reaction chamber 104. Tubular inlets 216, 218 provide for the flow of shielding gas into tubular sections 208, 210 to reduce the contamination of windows 212, 214. Tubular inlets 216, 218 are connected to inert gas source 138 or to a separate inert gas source. In either case, flow to inlets 216, 218 preferably is controlled by a mass flow controller 220.

Laser 108 is aligned to generate a laser beam 222 that enters window 212 and exits window 214. Windows 212, 214 define a laser light path through main chamber 200 intersecting the flow of reactants at reaction zone 224. After exiting window 214, laser beam 222 strikes power meter 226, which also acts as a beam dump. An appropriate power meter is available from Coherent Inc., Santa Clara, Calif. Laser 108 can be replaced with an intense conventional light source such as an arc lamp. Preferably, laser 108 is an infrared laser, especially a CW $CO_2$ laser such as an 1800 watt maximum power output laser available from PRC Corp., Landing, N.J.

Reactants passing through slit 206 in injection nozzle 202 initiate a molecular stream. The molecular stream passes through reaction zone 224, where reaction involving the metal precursor compound takes place. Heating of the gases in reaction zone 224 is extremely rapid, roughly on the order of $10^{5\circ}$ C./sec depending on the specific conditions. The reaction is rapidly quenched upon leaving reaction zone 224, and particles 228 are formed in the molecular stream. The nonequilibrium nature of the process allows for the production of particles with a highly uniform size distribution and structural homogeneity.

The path of the molecular stream continues to collection nozzle 230. Collection nozzle 230 is spaced about 2 cm from injection nozzle 202. The small spacing between injection nozzle 202 and collection nozzle 230 helps reduce the contamination of reaction chamber 104 with reactants and products. Collection nozzle 230 has a circular opening 232. Circular opening 232 feeds into collection system 106.

The chamber pressure is monitored with a pressure gauge attached to the main chamber. The chamber pressure generally ranges from about 5 Torr to about 1000 Torr.

Reaction chamber 104 has two additional tubular sections not shown. One of the additional tubular sections projects into the plane of the sectional view in FIG. 1, and the second additional tubular section projects out of the plane of the sectional view in FIG. 1. When viewed from above, the four tubular sections are distributed roughly, symmetrically around the center of the chamber. These additional tubular sections have windows for observing the inside of the chamber. In this configuration of the apparatus, the two additional tubular sections are not used to facilitate production of particles.

Collection system 106 can include a curved channel 250 leading from collection nozzle 230. Because of the small size of the particles, the product particles follow the flow of the gas around curves. Collection system 106 includes a filter 252 within the gas flow to collect the product particles. A variety of materials such as teflon, glass fibers and the like can be used for the filter as long as the material is inert and has a fine enough mesh to trap the particles. Preferred materials for the filter include, for example, a glass fiber filter from ACE Glass Inc., Vineland, N.J.

Pump 254 is used to maintain collection system 106 at a selected pressure. A variety of different pumps can be used. Appropriate pumps for use as pump 254 include, for example, Busch Model B0024 pump from Busch, Inc., Virginia Beach, Va. with a pumping capacity of about 25 cubic feet per minute (cfm) and Leybold Model SV300 pump from Leybold Vacuum Products, Export, Pa. with a pumping capacity of about 195 cfm. It may be desirable to flow the exhaust of the pump through a scrubber 256 to remove any remaining reactive chemicals before venting into the atmosphere. The entire apparatus 100 can be placed in a fume hood for ventilation purposes and for safety considerations. Generally, the laser remains outside of the fume hood because of its large size.

The apparatus is controlled by a computer. Generally, the computer controls the laser and monitors the pressure in the reaction chamber. The computer can be used to control the flow of reactants and/or the shielding gas. The pumping rate is controlled by either a manual needle valve or an automatic throttle valve inserted between pump 254 and filter 252. As the chamber pressure increases due to the accumulation of particles on filter 252, the manual valve or the throttle valve can be adjusted to maintain the pumping rate and the corresponding chamber pressure.

The reaction can be continued until sufficient particles are collected on filter 252 such that the pump can no longer maintain the desired pressure in the reaction chamber 104 against the resistance through filter 252. When the pressure in reaction chamber 104 can no longer be maintained at the desired value, the reaction is stopped, and the filter 252 is removed. With this embodiment, about 3–75 grams of particles can be collected in a single run before the chamber pressure can no longer be maintained. A single run generally can last from about 10 minutes to about 3 hours depending on the type of particle being produced and the particular filter. Therefore, it is straightforward to produce a macroscopic quantity of particles, i.e., a quantity visible with the naked eye.

The reaction conditions can be controlled relatively precisely. The mass flow controllers are quite accurate. The laser generally has about 0.5 percent power stability. With either a manual control or a throttle valve, the chamber pressure can be controlled to within about 1 percent.

The configuration of the reactant supply system 102 and the collection system 106 can be reversed. In this alternative configuration, the reactants are supplied from the bottom of the reaction chamber, and the product particles are collected from the top of the chamber. This alternative configuration tends to result in a slightly higher collection of product for particles that tend to be buoyant in the surrounding gases. In this configuration, it is preferable to include a curved section in the collection system so that the collection filter is not mounted directly above the reaction chamber.

An alternative design of a laser pyrolysis apparatus has been described. See, commonly assigned U.S. patent application Ser. No. 08/808,850, now U.S. Pat. No. 5,958,348 entitled "Efficient Production of Particles by Chemical Reaction," incorporated herein by reference. This alternative design is intended to facilitate production of commercial quantities of particles by laser pyrolysis. A variety of configurations are described for injecting the reactant materials into the reaction chamber.

The alternative apparatus includes a reaction chamber designed to minimize contamination of the walls of the chamber with particles, to increase the production capacity and to make efficient use of resources. To accomplish these objectives, the reaction chamber conforms generally to the shape of an elongated reactant inlet, decreasing the dead volume outside of the molecular stream. Gases can accumulate in the dead volume, increasing the amount of wasted radiation through scattering or absorption by nonreacting molecules. Also, due to reduced gas flow in the dead volume, particles can accumulate in the dead volume causing chamber contamination.

The design of the improved reaction chamber 300 is schematically shown in FIGS. 2 and 3. A reactant gas channel 302 is located within block 304. Facets 306 of block 304 form a portion of conduits 308. Another portion of conduits 308 join at edge 310 with an inner surface of main chamber 312. Conduits 308 terminate at shielding gas inlets 314. Block 304 can be repositioned or replaced, depending on the reaction and desired conditions, to vary the relationship between the elongated reactant inlet 316 and shielding gas inlets 314. The shielding gases from shielding gas inlets 314 form blankets around the molecular stream originating from reactant inlet 316.

The dimensions of elongated reactant inlet 316 preferably are designed for high efficiency particle production. Reasonable dimensions for the reactant inlet for the production of metal oxide or metal sulfide particles, when used with a 1800 watt $CO_2$ laser, are from about 5 mm to about 1 meter.

Main chamber 312 conforms generally to the shape of elongated reactant inlet 316. Main chamber 312 includes an outlet 318 along the molecular stream for removal of particulate products, any unreacted gases and inert gases. Tubular sections 320, 322 extend from the main chamber 312. Tubular sections 320, 322 hold windows 324, 326 to define a laser beam path 328 through the reaction chamber 300. Tubular sections 320, 322 can include shielding gas inlets 330, 332 for the introduction of shielding gas into tubular sections 320, 322.

The improved apparatus includes a collection system to remove the particles from the molecular stream. The collection system can be designed to collect a large quantity of particles without terminating production or, preferably, to run in continuous production by switching between different particle collectors within the collection system. The collection system can include curved components within the flow path similar to curved portion of the collection system shown in FIG. 1. The configuration of the reactant injection components and the collection system can be reversed such that the particles are collected at the top of the apparatus.

As noted above, properties of the metal compound particles can be modified by further processing. For example, oxide nanoscale particles can be heated in an oven in an oxidizing environment or an inert environment to alter the oxygen content and/or crystal structure of the metal oxide. The processing of nanoscale metal oxides in an oven is further discussed in commonly assigned and copending U.S. patent application Ser. No. 08/897,903, now U.S. Pat. No. 5,989,514 entitle "Processing of Vanadium Oxide Particles With Heat," incorporated herein by reference.

In addition, the heating process can be used possibly to remove adsorbed compounds on the particles to increase the quality of the particles. It has been discovered that use of mild conditions, i.e., temperatures well below the melting point of the particles, can result in modification of the stoichiometry or crystal structure of metal oxides without significantly sintering the particles into larger particles.

Figure 4:
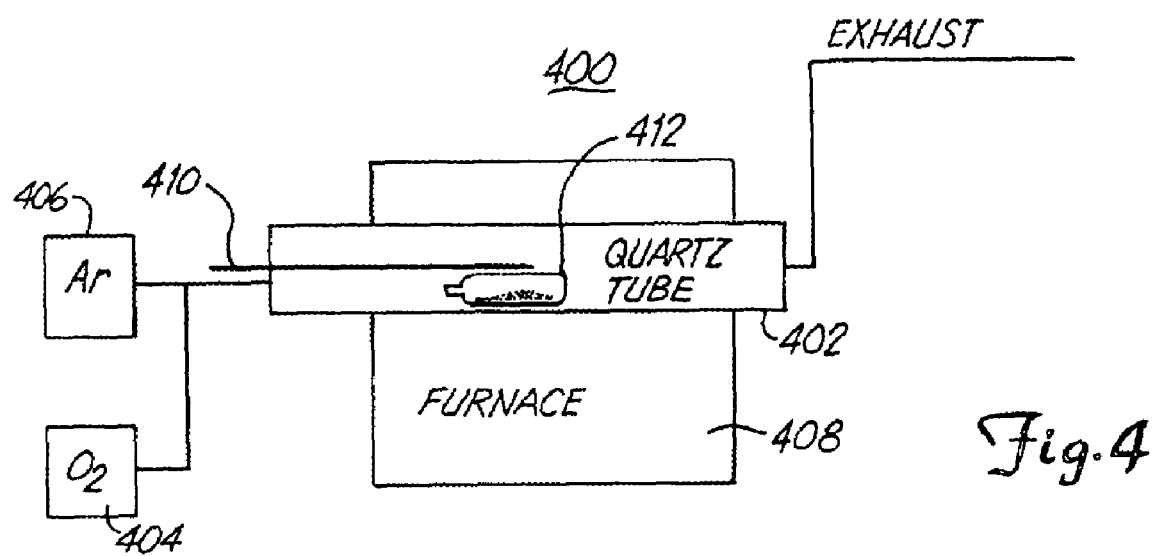
FIG. 4 is a schematic, sectional view of an oven for heating particles, in which the section is taken through the center of the quartz tube.

A variety of apparatuses can be used to perform the heat processing. An example of an apparatus 400 to perform this heat processing is displayed in FIG. 4. Apparatus 400 includes a tube 402 into which the particles are placed. Tube 402 is connected to a reactive gas source 404 and inert gas source 406. Reactant gas, inert gas or a combination thereof to produce the desired atmosphere are placed within tube 402.

Preferably, the desired gases are flowed through tube 402. Appropriate reactant gases to produce an oxidizing environment include, for example, $O_2$, $O_3$, Co, $CO_2$, and combinations thereof. The reactant gases can be diluted with inert gases such as Ar, He and $N_2$. The gases in tube 402 can be exclusively inert gases, if desired. The reactant gases may not result in changes to the stoichiometry of the particles being heated.

Tube 402 is located within oven or furnace 408. Oven 408 maintains the relevant portions of the tube at a relatively constant temperature, although the temperature can be varied systematically through the processing step, if desired. Temperature in oven 408 generally is measured with a thermocouple 410. The particles can be placed in tube 402 within a vial 412. Vial 412 prevents loss of the particles due to gas flow. Vial 412 generally is oriented with the open end directed toward the direction of the source of the gas flow.

The precise conditions including type of active gas (if any), concentration of active gas, pressure or flow rate of gas, temperature and processing time can be selected to produce the desired type of product material. The temperatures generally are mild, i.e., significantly below the melting point of the material. The use of mild conditions avoids interparticle sintering resulting in larger particle sizes. Some controlled sintering of the metal oxide particles can be performed in oven 408 at somewhat higher temperatures to produce slightly larger average particle diameters.

For the processing of titanium oxides and zinc oxides, the temperatures preferably range from about 50° C. to about 1000° C. and more preferably from about 80° C. to about 500° C. The particles preferably are heated for about 1 hour to about 100 hours. Some empirical adjustment may be required to produce the conditions appropriate for yielding a desired material.

B. Particle Properties

A collection of preferred particles has an average diameter of less than a micron, preferably from about 5 nm to about 500 nm and more preferably from about 5 nm to about 100 nm, and even more preferably from about 5 nm to about 50 nm. The particles generally have a roughly spherical gross appearance. Upon closer examination, the particles generally have facets corresponding to the underlying crystal lattice. Nevertheless, the particles tend to exhibit growth that is roughly equal in the three physical dimensions to give a gross spherical appearance. Diameter measurements on particles with asymmetries are based on an average of length measurements along the principle axes of the particle. The measurements along the principle axes preferably are each less than about 1 micron for at least about 95 percent of the particles, and more preferably for at least about 98 percent of the particles.

Because of their small size, the particles tend to form loose agglomerates due to van der Waals forces between nearby particles. Nevertheless, the nanometer scale of the particles (i.e., primary particles) is clearly observable in transmission electron micrographs of the particles. For crystalline particles, the particle size generally corresponds to the crystal size. The particles generally have a surface area corresponding to particles on a nanometer scale as observed in the micrographs.

Furthermore, the particles manifest unique properties due to their small size and large surface area per weight of material. Of particular relevance, the particles have an altered band structure, as described further below. The high surface area of the particles generally leads to high luminosity of the particles.

As produced, the particles preferably have a high degree of uniformity in size. As determined from examination of transmission electron micrographs, the particles generally have a distribution in sizes such that at least about 95 percent of the particles have a diameter greater than about 40 percent of the average diameter and less than about 160 percent of the average diameter. Preferably, the particles have a distribution of diameters such that at least about 95 percent of the particles have a diameter greater than about 60 percent of the average diameter and less than about 140 percent of the average diameter. The narrow size distributions can be exploited in a variety of applications, as described below. For some of the applications, it may be desirable to mix several collections of particles, each having a narrow diameter distribution, to produce a desired distribution of particle diameters and compositions.

At small crystalline diameters the band properties of the particles are altered. The increase in band gap is approximately in proportion to $1/(\text{particle size})^2$. For especially small particle sizes, the density of states may become low enough that the band description may become incomplete as individual molecular orbitals play a more prominent role. The qualitative trends should hold regardless of the need to account for a molecular orbital description of the electronic properties.

In addition, with a uniform distribution of small particles, the emission spectrum narrows because of the reduction of inhomogeneous broadening. The result is a sharper emission spectrum with an emission maximum that depends on the average particle diameter. Thus, the use of very small particle diameters may allow for adjustment of emission characteristics without the need to activate the particles with a second metal.

Furthermore, the small size of the particles allows for the formation of very thin layers. This is advantageous for use with low velocity electrons since the electrons may not penetrate deeply within a layer. The small size of the particles is also conducive to the formation of small patterns, for example using photolithography, with sharp edges between the elements of the pattern. The production of small, sharply separated elements is important for the formation of high resolution displays.

In addition, the particles produced as described above generally have a very high purity level. Metal oxide and sulfide particles produced by the above methods are expected to have a purity greater than the reactant gases because the crystal formation process tends to exclude contaminants from the lattice. Furthermore, metal oxide and sulfide particles produced by laser pyrolysis generally have a high degree of crystallinity and few surface distortions.

Although under certain conditions mixed phase material may be formed, laser pyrolysis generally can be effectively used to produce single phase crystalline particles. Primary particles generally consist of single crystals of the material. The single phase, single crystal properties of the particles can be used advantageously along with the uniformity and narrow size distribution. Under certain conditions, amorphous particles may be formed by laser pyrolysis. Some amorphous particles can be heated under mild conditions to form crystalline particles.

Zinc oxides can have a stoichiometry of, at least, ZnO (hexagonal crystal, Wurtzite structure) or $ZnO_2$. The production parameters can be varied to select for a particular stoichiometry of zinc oxide. Zinc sulfide has a cubic crystal lattice generally with a zinc blend structure. $Y_2O_3$ has a cubic crystal lattice.

Titanium dioxide is known to exist in three crystalline phases, anatase, rutile and brookite, as well as an amorphous phase. The anatase and rutile phases have a tetrahedral crystal lattice, and the brookite phase has an orthorhombic crystal structure. The conditions of the laser pyrolysis can be varied to favor the formation of a single, selected phase of $TiO_2$. In addition, heating of small metal oxide particles under mild conditions may be useful to alter the phase or composition of the materials.

C. Phosphors and Displays

The particles described in this application can be used as phosphors. The phosphors emit light, preferably visible light, following excitation. A variety of ways can be used to excite the phosphors, and particular phosphors may be responsive to one or more of the excitation approaches. Particular types of luminescence include cathodoluminescence, photoluminescence and electroluminescence which, respectively, involve excitation by electrons, light and electric fields. Many materials that are suitable as chathodoluminescence phosphors are also suitable as electroluminescence phosphors.

In particular, the particles preferably are suitable for low-velocity electron excitation, with electrons accelerated with potentials below 1 KV, and more preferably below 100 V. The small size of the particles makes them suitable for low velocity electron excitation. Furthermore, the particle produce high luminescence with low electron velocity excitation. The phosphor particles can be used to produce any of a variety of display devices based on low velocity electrons, high velocity electrons, or electric fields.

Figure 5:
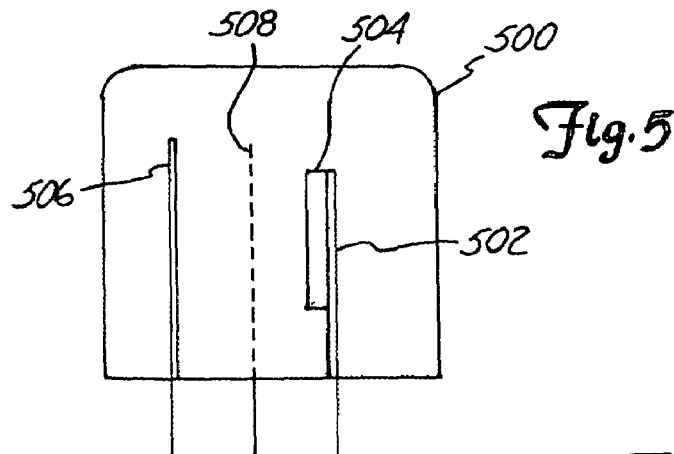
FIG. 5 is a sectional view of an embodiment of display device incorporating a phosphor layer.

Referring to FIG. 5, a display device 500 includes an anode 502 with a phosphor layer 504 on one side. The phosphor layer faces an appropriately shaped cathode 506, which is the source of electrons used to excite the phosphor. A grid cathode 508 can be placed between the anode 502 and the cathode 506 to control the flow of electrons from the cathode 506 to the anode 502.

Cathode ray tubes (CRTs) have been used for a long time for producing images. CRTs generally use relatively higher electron velocities. Phosphor particles, as described above, can still be used advantageously as a convenient way of supplying particles of different colors, reducing the phosphor layer thickness and decreasing the quantity of phosphor for a given luminosity. CRTs have the general structure as shown in FIG. 5, except that the anode and cathode are separated by a relatively larger distance and steering electrodes rather than a grid electrode generally are used to guide the electrons from the cathode to the anode.

Figure 6:
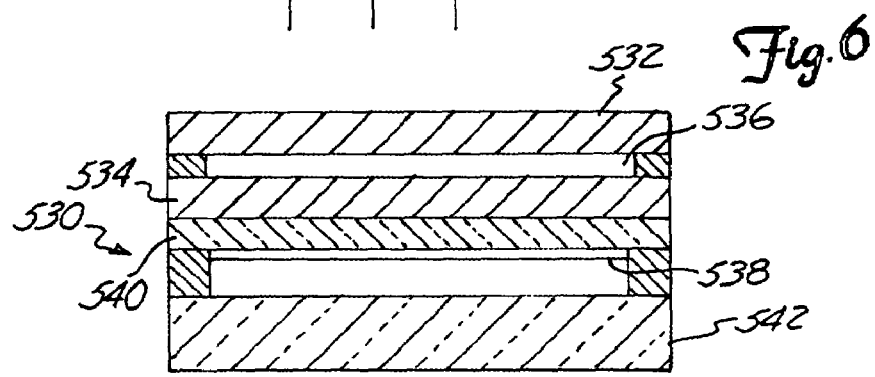
FIG. 6 is a sectional view of an embodiment of a liquid crystal display incorporating a phosphor for illumination.

Other preferred applications include the production of flat panel displays. Flat panel displays can be based on, for example, liquid crystals or field emission devices. Liquid crystal displays can be based on any of a variety of light sources. Phosphors can be useful in the production of lighting for liquid crystal displays. Referring to FIG. 6, a liquid crystal element 530 includes at least partially light transparent substrates 532, 534 surrounding a liquid crystal layer 536. Lighting is provided by a phosphor layer 538 on an anode 540. Cathode 542 provides a source of electrons to excite the phosphor layer 538. Alternative embodiments are described, for example, in U.S. Pat. No. 5,504,599, incorporated herein by reference.

Figure 7:
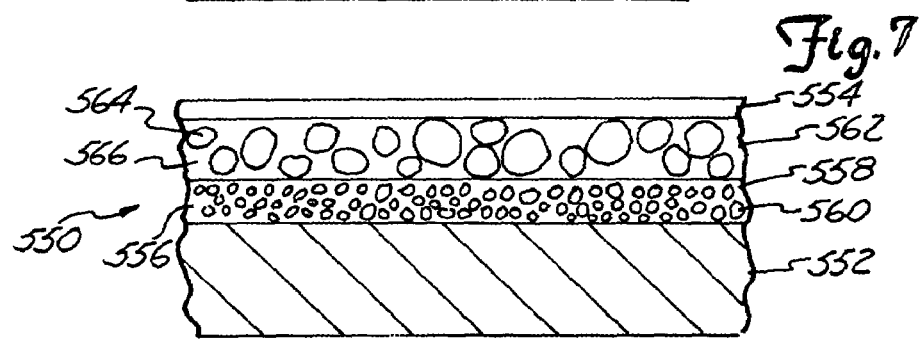
FIG. 7 is a sectional view of an electroluminescent display.

Liquid crystal displays can also be illuminated with backlighting from an electroluminescenct display. Referring to FIG. 7, electroluminescent display 550 has a conductive substrate 552 that functions as a first electrode. Conductive substrate 552 can be made from, for example, aluminum, graphite or the like. A second electrode 554 is transparent and can be formed from, for example, indium tin oxide. A dielectric layer 556 may be located between electrodes 552, 554, adjacent to first electrode 552. Dielectric layer 556 includes a dielectric binder 558 such as cyanoethyl cellulose or cyanoethyl starch. Dielectric layer 556 can also include ferroelectric material 560 such as barium titanate. Dielectric layer 556 may not be needed for dc-driven (in contrast with ac-driven) electroluminescent devices. A phosphor layer 562 is located between transparent electrode 554 and dielectric layer 562. Phosphor layer 562 includes electroluminescent particles 564 in a dielectric binder 566.

Electroluminescent display 550 also can be used for other display applications such as automotive dashboard and control switch illumination. In addition, a combined liquid crystal/electroluminescent display has been designed. See, Fuh, et al., Japan J. Applied Phys. 33:L870–L872 (1994), incorporated herein by reference.

Figure 8:
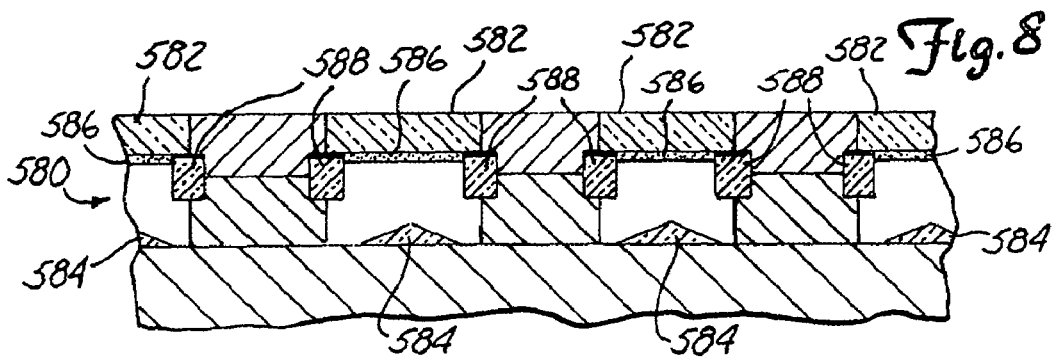
FIG. 8 is a sectional view of an embodiment of a flat panel display incorporating field emission display devices.

Referring to FIG. 8, a display 580 based on field emission devices involves anodes 582 and cathodes 584 spaced a relatively small distance apart. Each electrode pair form an individually addressable pixel. A phosphor layer 586 is located between each anode 582 and cathode 584. The phosphor layer 586 includes phosphorescent nanoparticles as described above. Phosphorescent particles with a selected emission frequency can be located at a particular addressable location. The phosphor layer 586 is excited by low velocity electrons travelling from the cathode 584 to the anode 582. Grid electrodes 588 can be used to accelerate and focus the electron beam as well as act as an on/off switch for electrons directed at the phosphor layer 586. An electrically insulating layer is located between anodes 582 and grid electrodes 588. The elements are generally produced by photolithography or a comparable techniques such as sputtering and chemical vapor deposition for the production of integrated circuits. As shown in FIG. 8, the anode should be at least partially transparent to permit transmission of light emitted by phosphor 586.

Alternatively, U.S. Pat. No. 5,651,712, incorporated herein by reference, discloses a display incorporating field emission devices having a phosphor layer oriented with an edge (rather than a face) along the desired direction for light propagation. The construction displayed in this patent incorporates color filters to produce a desired color emission rather than using phosphors that emit at desired frequencies. Based on the particles described above, selected phosphor particles preferably would be used to produce the different colors of light, thereby eliminating the need for color filters.

The phosphor particles can be adapted for use in a variety of other devices beyond the representative embodiments specifically described.

The nanoparticles can be directly applied to a substrate to produce the above structures. Alternatively, the nanoparticles can be mixed with a binder such as a curable polymer for application to a substrate. The composition involving the curable binder and the phosphor nanoparticles can be applied to a substrate by photolithography or other suitable technique for patterning a substrate such as used in the formation of integrated circuit boards. Once the composition is deposited at a suitable positions on the substrate, the material can be exposed to suitable conditions to cure the polymer. The polymer can be curable by electron beam radiation, UV radiation or other suitable techniques.

The embodiments described above are intended to be representative and not limiting. Additional embodiments of the invention are within the claims. As will be understood by those skilled in the art, many changes in the methods and apparatus described above may be made by the skilled practitioner without departing from the spirit and scope of the invention, which should be limited only as set forward in the claims which follow.

What is claimed is:

1. A display device comprising a collection of phosphor particles having an average diameter from about 15 nm to about 100 nm and having a diameter distribution such that at least about 95 percent of the particles have a diameter greater than about 60 percent of the average diameter and less than about 140 percent of the average diameter.

2. The display device of claim 1 wherein the phosphor particles comprise ZnO.

3. The display device of claim 1 wherein the phosphor particles have an average diameter from about 15 nm to about 50 nm.

4. The display device of claim 1 wherein the light emission follows low velocity electron excitation.

5. The display device of claim 1 wherein the phosphor particles further comprise a second collection of particles, the second collection of particles having a diameter distribution such that at least about 95 percent of the particles have a diameter greater than about 40 percent of the average diameter and less than about 160 percent of the average diameter.

6. The display device of claim 1 wherein the phosphor particles are in contact with an anode.

7. The display device of claim 1 further comprising a liquid crystal layer.

8. The display device of claim 1 further comprising a partially light transparent substrate.

9. The display device of claim 1 further comprising a transparent electrode comprising indium tin oxide.

10. The display device of claim 1 further comprising an electrode to guide the electrons from the cathode to the anode.

11. The display device of claim 1 wherein the display is an electroluminescent display.

12. The display device of claim 1 wherein the device is a field emission device with the phosphor particles located between an anode and cathode.

13. The display device of claim 12 comprising a plurality of anodes and cathodes where each electrode pair forms an addressable pixel.

14. The display device of claim 1 wherein the phosphor particles are excitable by low velocity electrons.

15. The display device of claim 1 wherein the phosphor particles comprise a metal compound selected from the group consisting of $ZnO$, $ZnS$, $TiO_2$ and $Y_2O_3$.

16. The display device of claim 1 wherein the phosphor particles are roughly spherical.

* * * * *